(12) United States Patent
Carder (10) Patent No.: US 6,915,745 B2
(45) Date of Patent: Jul. 12, 2005

(54) SELF-LUBRICATING OVERHEAD CONVEYOR SYSTEM

(75) Inventor: Tom Carder, Birmingham, AL (US)

(73) Assignee: Tac Lube, LLC, Mountain Brook, AL (US)

( * ) Notice: Subject to any disclaimer, the term of this patent is extended or adjusted under 35 U.S.C. 154(b) by 172 days.

(21) Appl. No.: 10/346,750

(22) Filed: Jan. 17, 2003

(65) Prior Publication Data

US 2004/0140160 A1 Jul. 22, 2004

(51) Int. Cl.$^7$ .......................... B61B 11/00; F16N 13/22
(52) U.S. Cl. ...................... 105/155; 184/15.1; 384/463
(58) Field of Search .................. 105/148, 150, 105/154; 104/89, 93; 184/15.1, 17; 384/463, 470; 474/161, 162, 207

(56) References Cited

U.S. PATENT DOCUMENTS

| | | | |
|---|---|---|---|
| 3,055,297 | A | 9/1962 | Leeds |
| 3,873,894 | A | 3/1975 | Tucker, Jr. |
| 4,963,040 | A | 10/1990 | Takebayashi et al. |
| 4,993,328 | A | * 2/1991 | Wendt et al. ............... 105/150 |
| 5,066,145 | A | 11/1991 | Sibley |
| 5,277,126 | A | 1/1994 | Wendt et al. |
| 5,357,868 | A | * 10/1994 | Maas ......................... 105/180 |
| 5,398,618 | A | 3/1995 | McMullen |
| 5,566,623 | A | 10/1996 | Wareham |
| 5,947,260 | A | * 9/1999 | Sorbara et al. ............. 198/500 |
| 6,070,697 | A | 6/2000 | Millard |
| 6,247,555 | B1 | 6/2001 | Millard |
| 6,296,393 | B1 | 10/2001 | Yabe et al. |
| 6,569,816 | B2 | * 5/2003 | Oohira et al. ............... 508/107 |
| 6,702,091 | B2 | * 3/2004 | Nimmo et al. ................ 193/37 |

* cited by examiner

*Primary Examiner*—S. Joseph Morano
*Assistant Examiner*—Robert J. McCarry, Jr.
(74) *Attorney, Agent, or Firm*—Bradley, Arant, Rose & White, LLP (57) ABSTRACT

Described are a self-lubricating, overhead conveyor system and the component parts thereof. The self-lubricating overhead conveyor system obviates the need for added lubricants, and comprises three main components: a trolley assembly, a conveyor chain and a turn wheel assembly. In one embodiment, all three components are integrated to provide an improved overhead conveyor system; however, individual components may be used to retrofit conventional overhead conveyor systems. The trolley assemblies contain a self-lubricating precision ball bearing assembly, and are joined together by a surface hardened conveyor chain internally treated to resist corrosion and eliminate flaking. The turn wheel assemblies are configured to engage the conveyor chain and provide continuous lubrication and cleaning to the conveyor chain. All components of the conveyor system of the present disclosure meet criteria established by the United States Department of Agriculture (USDA) for use in food processing applications.

47 Claims, 8 Drawing Sheets

SELF-LUBRICATING OVERHEAD CONVEYOR SYSTEM

FIELD OF THE DISCLOSURE

The present disclosure relates generally to systems for transporting articles in an industrial setting. More particularly, the present disclosure is directed toward a self-lubricating, overhead conveyor system and the component parts thereof.

BACKGROUND

It is common in industrial settings to employ overhead conveyor systems to move articles from point to point, as may be required in many industrial applications. These overhead conveyor systems typically include an overhead track system, several trolley assemblies, a conveyor chain to join and drive the trolley assemblies along the track and turn wheel assemblies to guide the conveyor chain. The trolley assemblies have attached hangers which extend below the track to transport the desired articles along the track.

The typical overhead conveyor systems described above, while useful, suffer from several disadvantages. First, the various components of the trolley wheel systems require significant amounts of maintenance. If the components of the trolley wheel systems are not maintained properly, the system will not operate at optimal levels. As one example of required maintenance, most trolley wheel assemblies require that additional lubrication be added from time to time (the additional lubrication itself presents some problems as discussed below). The lubricant helps decrease component part wear, at least partially, by decreasing the coefficient of friction associated with the operation on the conveyor system. If the addition of lubrication is ignored, the coefficient of friction will increase, placing increased stress on the component parts, which may lead to system failure. For example, if lubrication maintenance is not performed, the friction generated by the trolley assemblies will increase. This increases the resistance the conveyor system encounters and places stress on the components of the conveyor system, as well as increasing the energy required to operate the conveyor system. Likely results will be an increase in the chain pitch (or chain length) and/or premature chain failure. If the chain pitch is increased enough, the timing of the system may be impacted, causing defects in the associated industrial processes. In either case, the conveyor system and its associated industrial process must be stopped so that sections of chain can be removed to restore the original pitch to the chain or a new chain installed. The maintenance problems are exacerbated when the trolley wheel systems are required to function in harsh environments. In these situations, the maintenance requirements for trolley wheel systems may be further increased.

As stated above, adding additional lubricants to overhead conveyor systems presents significant problems. The additional lubrication will drop from the trolley wheel system during operation, and potentially contaminate the articles carried by the trolley wheel system. The added lubricant may mix with rust that has developed on the components of the conveyor system as well, bringing additional contaminates into contact with the articles carried by the system. This phenomenon is so common in some industries (such as the poultry processing industry), it is known as "rail dust," which is sometimes referred to as "black rain."

Finally, the individual components of the conveyor systems are not engineered as a unit to maximize the operation and longevity of the system. As discussed above, increased friction, caused by the design of the individual components and inadequate lubrication, may cause changes in the chain pitch. Solutions to this problem have been to design trolley wheel assemblies with improved lubrication properties. However, these solutions only address part of the underlying issue. For example, a conveyor chain with improved resistance to changes in pitch could be combined with a trolley wheel assembly with improved properties, to improve the operation of the conveyor system as a whole.

Such a synergistic approach has been lacking. The present disclosure provides such an approach to describe an improved overhead conveyor system and the component parts thereof.

SUMMARY

The present disclosure describes a self-lubricating, overhead conveyor system and the component parts thereof. The conveyor system has a primary application in the manufacturing and food processing fields, but is suitable for use in any application that requires the movement of articles from point to point. The overhead conveyor system comprises three main components, a trolley assembly, a conveyor chain and a turn wheel assembly. In one embodiment, all three components are integrated to provide an improved overhead conveyor system. In an alternate embodiment, individual components as described, alone or in various combinations, are used to retrofit conventional overhead conveyor systems to increase the performance of these systems.

In operation, a plurality of trolley assemblies are configured to be removably coupled to a track system, such as an I-beam track, suspended above the ground. The individual trolley assemblies are joined together by the conveyor chain. The conveyor chain is propelled down the track by a drive means, such as a conventional drive assembly, or other device. A conventional drive assembly comprises a drive motor a reducer and drive sprockets to engage the conveyor chain. Typically, several drive assemblies are used per conveyor system. The turn wheel assemblies are located at predetermined locations along the suspended track and are configured to engage the conveyor chain. The turn wheel assemblies function to maintain the trolley assemblies and the conveyor chain in the correct orientation when the conveyor system changes direction, and to provide lubrication to the conveyor chains and to clean the conveyor chains.

In one embodiment, the trolley assemblies are self-lubricating, thereby eliminating the need for additional lubrication. The trolley assemblies are joined together by a surface hardened conveyor chain internally treated to resist corrosion and eliminate flaking. The turn wheel assemblies are configured to engage the conveyor chain and provide continuous lubrication and cleaning to the conveyor chain, eliminating the need for added lubrication. All components of the conveyor system of the present disclosure meet criteria established by the United States Department of Agriculture (USDA) for use in food processing applications.

Therefore, it is an object of the disclosure to provide a self-lubricating conveyor system. The self-lubricating conveyor system reduces drag and the coefficient of friction of the conveyor system, reducing the wear to the components of the conveyor system and increasing the life of the conveyor system. It is a further object of the disclosure to provide a trolley assembly comprising a lubricating element to eliminate the need for added lubrication to the trolley assembly. An additional object of the disclosure is to provide a trolley wheel where the lubricating element provides a barrier to reduce contamination of the trolley assembly. An additional object of the invention is to provide a conveyor system that reduces potential contamination caused by added lubricants, sometimes referred to as "rail dust." It is a further object of the disclosure to provide a conveyor system that has an increased useful life and requires less maintenance than conventional conveyor systems. An additional object is to provide a trolley assembly that eliminates the possibility of pre-loading the trolley wheel assembly. It is a further object of the invention to provide a conveyor system that meets all applicable U.S.D.A. regulations and requirements and is suitable for use in food processing operations.

The above stated objects of the invention are alternative and exemplary objects only, and should not be read such that all objects and advantages are required for the practice of the invention in every embodiment described. The above objects and advantages are neither exhaustive nor individually critical to the spirit and practice of the invention. Other or alternative objects and advantages of the present invention will become apparent to those skilled in the art from the following description of the invention.

DETAILED DESCRIPTION

Trolley Assembly

Figure 1:
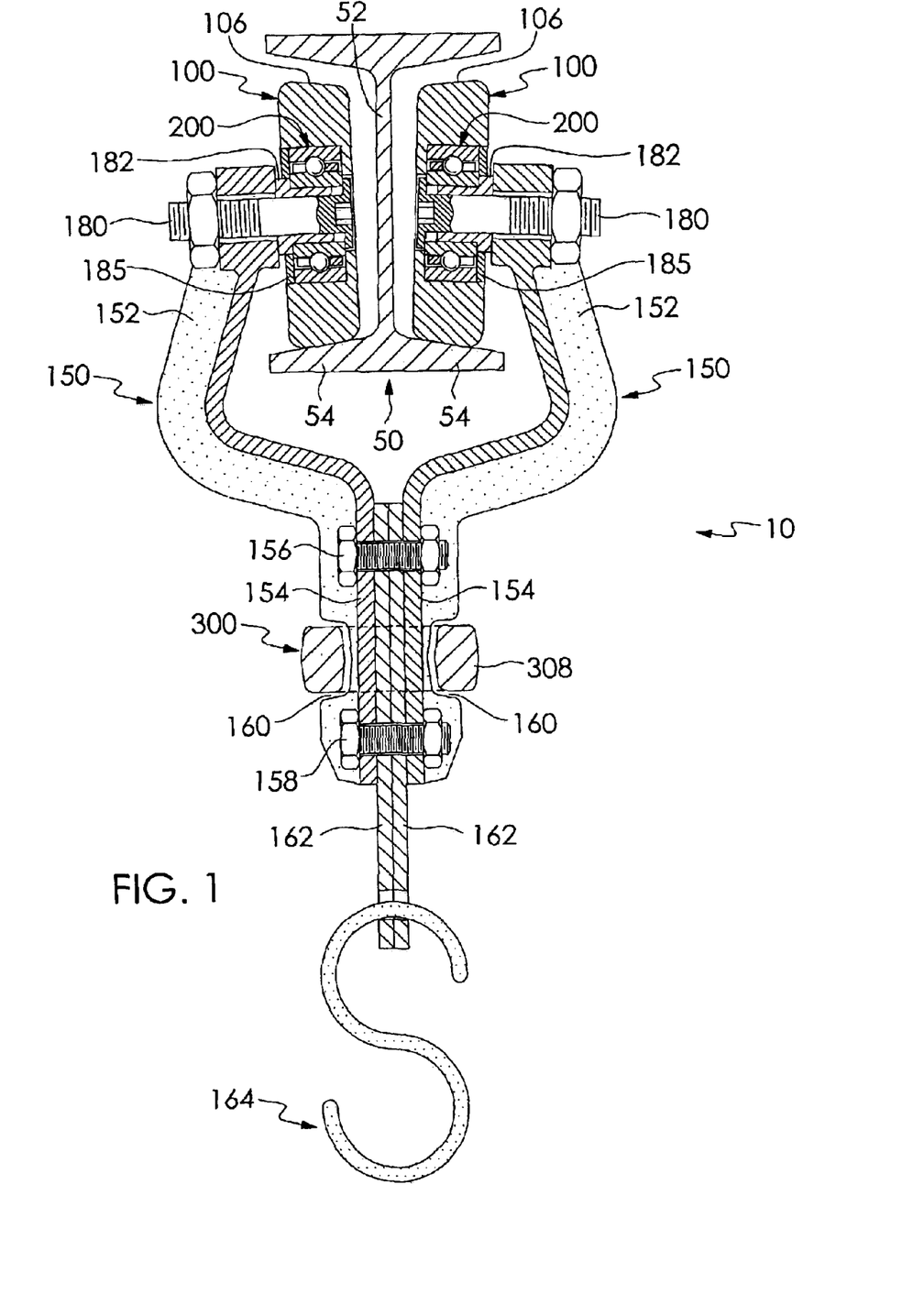
FIG. 1 shows one embodiment of the overhead conveyor system of the present invention, illustrating the interaction of the trolley wheel assembly with an I-beam track.

The trolley assembly 10 of the present disclosure is adapted for use with an I-beam track 50 of conventional design as shown in FIG. 1. The track 50 comprises a support 52 with two laterally inclined flanges 54 to support and guide a plurality of trolley assemblies 10. In one embodiment, each trolley assembly 10 comprises a pair of trolley wheels 100, each wheel 100 removably coupled to a trolley bracket 150 by a fastening means, illustrated in FIG. 1 as bolt 180 and bushing 182. Each trolley wheel 100 further comprises a self-contained ball bearing element 200.

The trolley brackets 150 are of standard design and comprise an angular upper portion 152 and a depending flanged portion 154. The angular upper portion 152 forms a recess to receive the trolley wheels 100 in a manner so that trolley wheels 100 can engage the lateral flanges 54 of the track 50. Two trolley brackets 150 are removably secured together at apertures 154 at 156 and 158 by bolts or other means. Flanges 154 comprise a notched portion 160 between 156 and 158 to receive the conveyor chain 300 (as described below). Sandwiched between the flanges 154 is a hanger bracket 162 to receive a hook 164 to support the load carried by the trolley wheel assemblies 10.

Figure 2A:
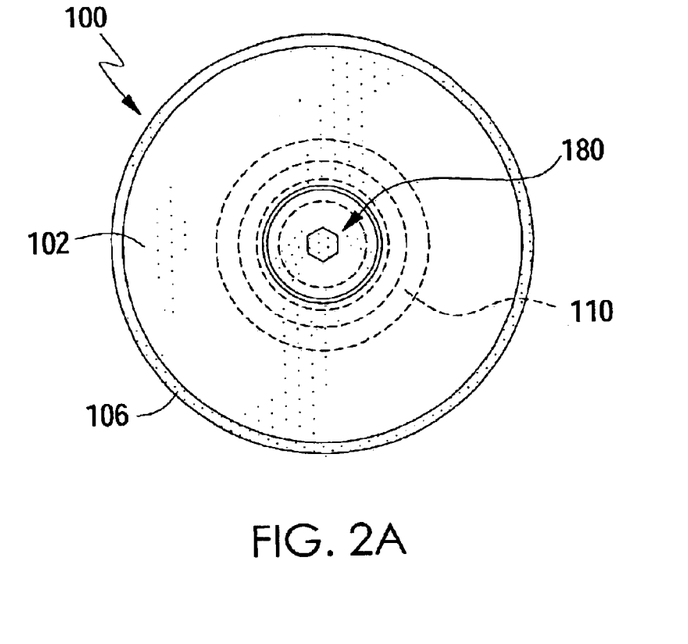
FIG. 2A shows a front view of one embodiment of the trolley wheel.
Figure 2B:
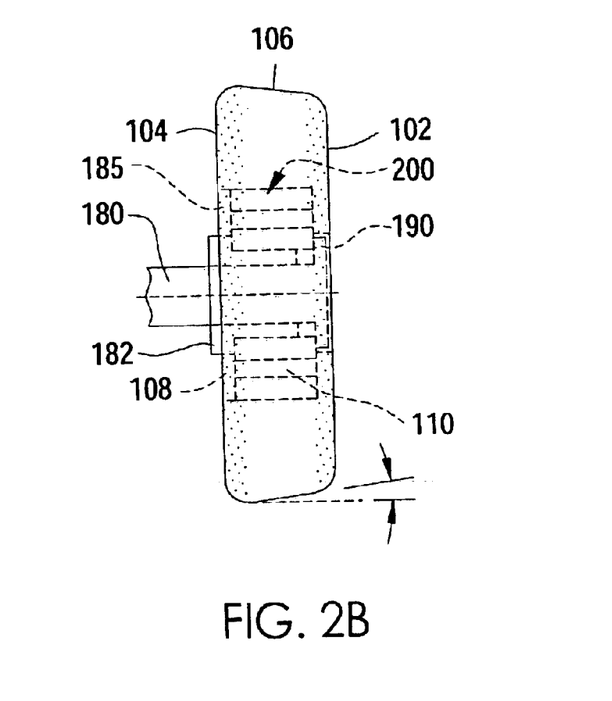
FIG. 2B shows a side view of one embodiment of the trolley wheel.

The trolley wheel 100 comprises a front side 102, a back side 104 and an outer peripheral surface 106 adapted to engage the track 50 (see FIG. 2A and FIG. 2B). The peripheral surface 106 joins the front side 102 and back side 104 of wheel 100. The rear side 104 contains a chamber 110 adapted to receive the bearing element 200. The chamber 110 is of sufficient dimensions to receive the bearing element 200, with the exact dimensions depending on the configuration of bearing element 200 and the material composition of the trolley wheel 100. In one embodiment, the radius of the chamber 110 is in the range of 39.5 to 41.5 millimeters. A radius of 40.0 millimeters will receive a bearing element 200 such that the bearing element 200 will not separate from the trolley wheel 100 (when the trolley wheel 100 is manufactured from Delrin® and assembled as discussed below). In addition, a cover 185 may be sonically welded over the chamber 110 to further prevent separation of the bearing assembly 200 from the trolley wheel 100. The cover 185 also serves as a barrier to prevent against contamination of the trolley wheel 100 and the bearing assembly 200. The front side 102 contains an opening 108 to receive the fastening means (bolt 180 and bushing 182). The outer peripheral surface 106 may be designed to incorporate an angle (as shown in FIG. 2B). The angle functions to improves transit of the trolley wheel 100 along the track 50 by reducing drag, and allows the trolley wheel 100 negotiate turns in the track 50 more efficiently. In one embodiment the angle of the outer peripheral surface ranges from 5 to 15 degrees as measured from the back side 104 to the front side 102. In an alternate embodiment, this angle is 7 degrees.

The width of the trolley wheel 100 is less than conventional trolley wheels. In one embodiment, the width of the outer peripheral surface 106 of the trolley wheel 100 is approximately 19 millimeters (FIG. 2B). The decreased width of trolley wheel 100 further decreases the coefficient of friction of the trolley wheels 100 against the track 50. Conventional trolley wheels were designed with increased width in order to increase the load bearing capacity of the trolley wheel. As discussed below, due to the novel bearing assembly 200 and fastening means incorporated into trolley wheels 100, load capacities can be increased without increasing the width of the trolley wheels 100.

The trolley wheel 100 is manufactured from a polymer material. In one embodiment, any resin marketed under the Delrin® series trade name (Delrin® trademark registered to E. I. du Pont de Nemours and Company; properties of Delrin® are described in technical literature accessible at www.dupont.com:8501/custom/plastics1/) is used as the polymer. One example is the acetyl homo-polymer form of Delrin® is used as the polymer. However, other polymers can be used, including, but not limited to, ultra-high molecular weight (UHMW), polypropylene, polyethylene or Teflon. Suitable polymers may exhibit resistance to compression, low drag characteristics and be able to function efficiently in a wide range of environmental conditions, as well be resistant to chemical reagents used in cleaning and maintenance of conveyor systems. The design of the trolley wheel 100 (in combination with the bushing 182 and cover 185) is designed to act as a protective shield against contamination of the ball bearing assembly 200.

Figure 3:
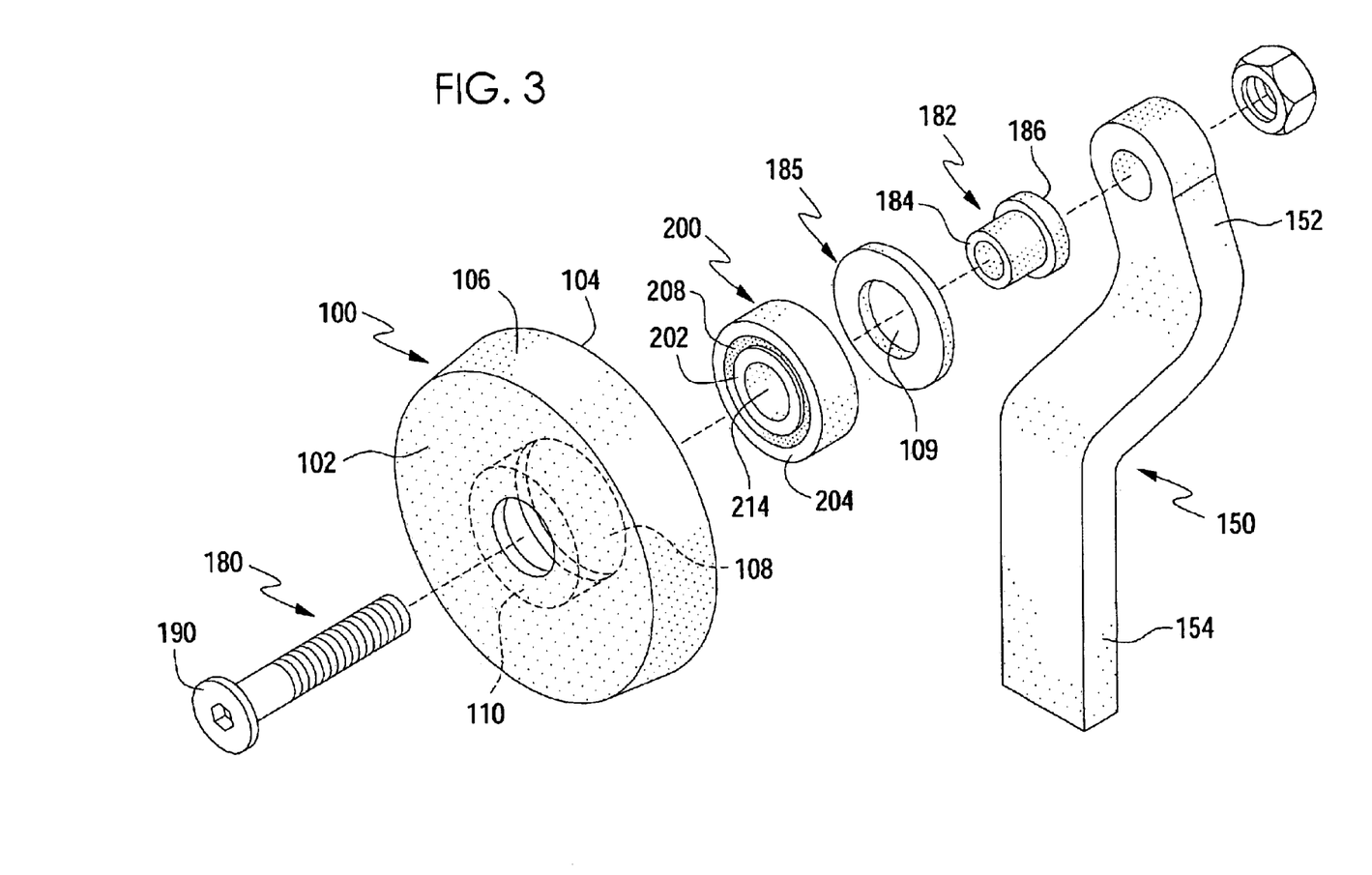
FIG. 3 shows a partially exploded side view of the trolley wheel assembly detailing the interaction of the fastening means with the trolley wheel.

The fastening means comprises a bolt 180 and bushing 182. The bushing 182 is manufactured from a polymer material to resist compression. The polymer material may be the same polymer material used in the construction of the trolley wheels 100, although other polymer materials may also be used. The bushing may be glass fibre filled to further resist compression. In one embodiment, the bushing is in the range of 15–35% glass fibre filled. The bushing 182 is configured with a crown 184 adapted to interact with opening 109 of the cover 185 and opening 214 of the bearing assembly 200 to allow self-adjustment of the trolley wheel 100 (FIG. 3). This self-adjustment allows the trolley wheel assemblies 10 to negotiate turns in track 50 without undergoing compression or impinging on track 50, which can lead to increased friction and drag, thereby reducing the efficiency of the conveyor system and increasing the stress applied to the components of the conveyor system. In addition, the bushing 182 has a back portion 186. One function of the back portion 186 is to provide separation of the back side 104 of the trolley wheel 100 with the trolley bracket 150. If the length of the back portion 186 is not sufficient, then trolley bracket 150 will impact the back side 104 of the trolley wheel 100, damaging the wheel. In one embodiment, the length of the back portion 186 is in the range of 8–12 millimetres. A length of 10.5 millimetres for back portion 186 is sufficient to allow for compression caused by the tightening of bolt 180 and prevent trolley bracket 150 from contacting the back side 104.

Bolt 182 can be manufactured from a variety of materials, including stainless steel and carbon steel. In one embodiment, the bolt 182 is manufactured from carbon steel that is treated to resist corrosion (as described below for the conveyor chain). Bolt 182 has a bolt head 190. The bolt 182 is placed through opening 108 of the trolley wheel 100, opening 214 of the bearing assembly 200 and opening X of the trolley bracket 150. The bolt head 190 rests against the inner race 202 of the bearing assembly 200. The bolt 182 is secured by a nut 192. As the nut 192 is secured on bolt 182, the bushing 180 is compressed and bolt head 192 is tightened against the inner race 202. In this manner, bolt head 190 clamps inner race 202 in place, preventing the inner race 202 from free rotation about the axis of bolt 182. The bolt head 190 is designed so that it does not extend past the plane formed by the front side 102. In one embodiment, the bolt head 190 is not greater than ⅛ inch thick. If the bolt head 190 does extend beyond the plane formed by the front side 102, the bolt head 190 may contact the support 52 or flanges 54 of track 50, created metal to metal contact. This contact increases the coefficient of friction and creates contamination.

Figure 4A:
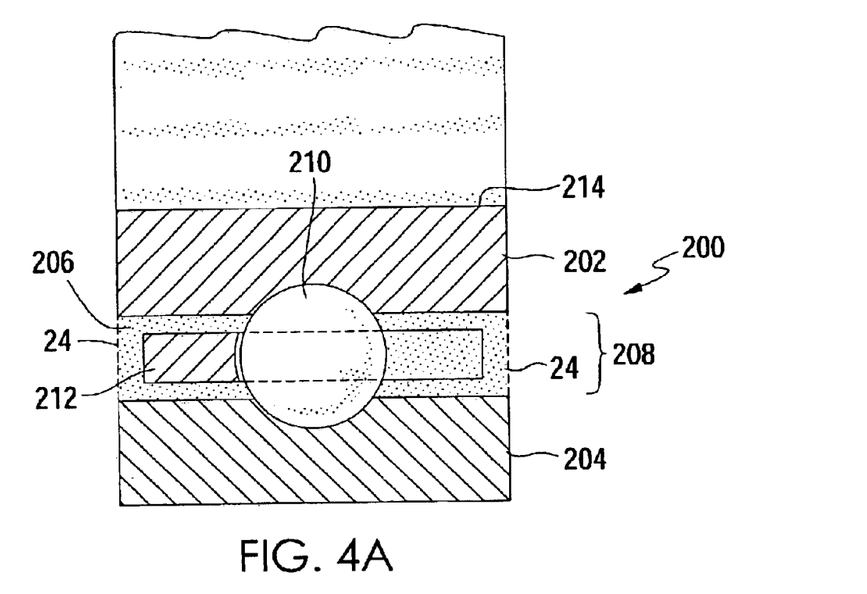
FIG. 4A shows a cutaway view of one embodiment of the ball bearing assembly.

The ball bearing assembly 200 comprises an inner race 202 and an outer race 204 joined together by a floor 206 (FIG. 4A). The inner race 202, outer race 204 and floor 206 define a raceway 208 to receive the balls 210. The floor 206 may contain a channel to provide a groove in the raceway 208 through which the balls 210 may travel.

Figure 4B:
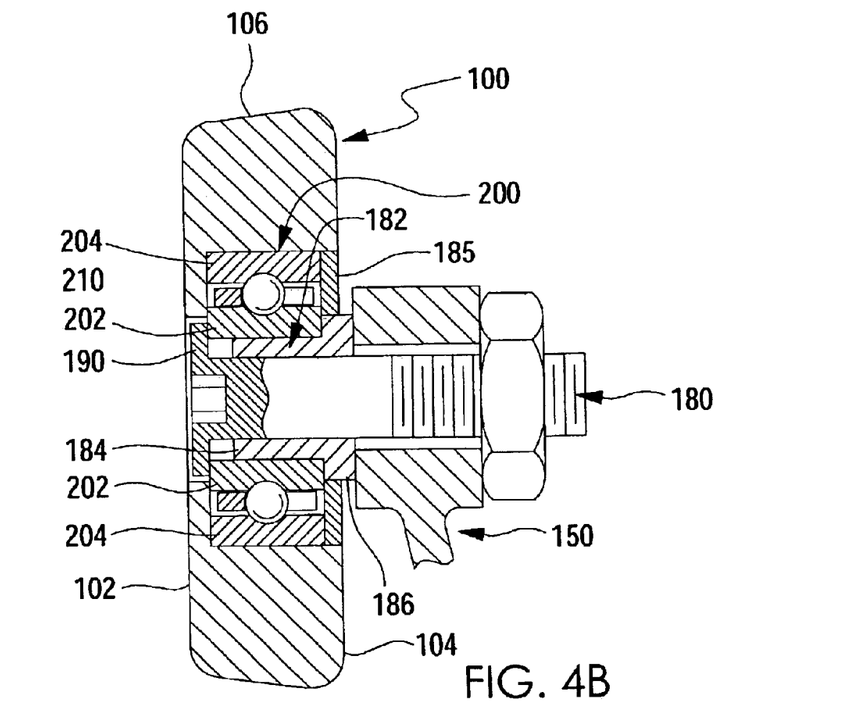
FIG. 4B shows the interaction of the fastening means with the trolley wheel and the ball bearing assembly.

The bearing assembly 200 is a self contained unit that is incorporated into the trolley wheels 100 at cavity 110. The inner race 202 and the outer race 204 are of unitary construction. Conventional trolley wheel assemblies traditionally utilize a two piece inner race assembly. The inner race serves several purposes in the trolley wheel. First, the inner race provides a shoulder for the fastening means that couples the trolley wheel to the trolley bracket. Second, the inner race defines a portion of the raceway for the rotation of the balls in the bearing assembly. By increasing or decreasing the torque applied to the fastening means, the internal clearance of the raceway in a two-piece inner race assembly can be altered (as the relative positions of the components of the 2-piece inner race are changed) to the point that the balls no longer have a free rotation in the raceway. This creates what is known as a pre-loading condition. The pre-loading condition affects the inertia of movement of the trolley wheel, requiring additional torque to rotate the trolley wheel (this condition is referred to as drag). In the present disclosure, the trolley wheels 100 are secured to the trolley brackets 150 by a fastening means, illustrated in FIGS. 1 and 4B as bolt 180 and bushing 182. The bolt 180 is designed such that the head 190 and the crown 184 of the bushing 182 contacts only the inner race 202 of the bearing assembly 200 (FIG. 4B). Since the inner race 202 is of unitary construction, altering the torque of the fastening means will not result in a pre-load condition.

In addition, in conventional trolley wheels, the outer race is often an integral portion of the trolley wheel itself, comprising a stainless steel band attached directly to the inner portion of the trolley wheel. Since the outer race is an integral part of the trolley wheel, movement of the trolley wheel could also alter the internal clearance of the raceway, leading to the problems described above. As a result, conventional trolley wheels have a measured inertia of approximately 0.014 Vs. Due to the self-contained nature of the bearing assembly 200 and the self-lubricating properties of the trolley wheels 100, the trolley wheels 100 of the present disclosure have a measured inertia of approximately 0.001 Vs.

In one embodiment, the bearing assembly 200 is not fully loaded, meaning that the balls 210 are separated by bearing cages (sometimes referred to as spacers) 212 (FIG. 4A). Conventional trolley wheel assemblies generally incorporate full complement, non-precision balls. The full complement state, while decreasing the cost of the bearing assembly and increasing the load the bearing assembly can support, leads to increased friction being generated as the balls interact with one another and decreased speeds of travel for the trolley wheel assemblies. The use of a non-full complement state in bearing assembly 200 eliminates these difficulties. A further improvement is directed towards the balls 210 of the bearing assembly 200. The bearing assembly 200 incorporates precision ground balls. In one embodiment, ABEC 1 standard precision ground stainless steel balls are used. The used of precision ground balls 210 leads to the elimination of the increased friction and drag created when non-precision ground balls are used (as in conventional trolley wheel assemblies). In addition, bearing assembly 200 may incorporate a groove to guide the balls 210 in raceway 208. The use of a non-full complement state combined with the use of precision ground balls 210 and groove in bearing assemblies 200 increases the performance of the trolley assemblies 10 over conventional trolley wheel assemblies.

The trolley wheel assemblies 10 of the present disclosure also comprise a self-lubricating means, shown as cured graphite mixture 24 in FIG. 4A. As a result, the trolley wheel assemblies 10 do not require additional lubrication over their lifetime. In one embodiment, a mixture of liquid graphite is poured into the raceway 208 of the bearing assembly 200. The graphite mixture encapsulates the balls 210 and the bearing cages 212, filling substantially all of the raceway 208 (FIG. 4A). The liquid graphite material comprises a mixture of graphite and phenolic resin, although other mixtures can be used, including but not limited to, graphite and MOS. The bearing assembly 200 with the added liquid graphite is then heated in a furnace to cure the liquid graphite. Typical temperature ranges for heating are from about 250 degrees Fahrenheit to about 650 degrees Fahrenheit. The curing time for the liquid graphite is about 1–6 hours. The tumbling of the balls 210 against the cured graphite 24 or other lubricating means allows lubricant to leach out over time, continuously lubricating the balls 210. Once cured, the graphite 24 becomes a permanent part of the bearing assembly 200 and provides permanent lubrication to the bearing assembly, obviating the need for added lubricants. The cured graphite 24 is inherently more stable than petroleum lubricants and has a much lower coefficient of friction. The reduced coefficient of friction is due in large part to the reduction in inertia drag created the bearing assembly 200 begins to rotate. When petroleum based lubricants are used in conventional bearing, the inertia drag is created by the channelling effect as the balls must create a path through the petroleum lubricant. In the current disclosure, the cured graphite moves with the balls 210, virtually eliminating inertia drag and reducing the coefficient of friction.

In the bearing assembly 200 of the present disclosure, increased loads can be tolerated because of the reduced coefficient of friction created by the design of the bearing assemblies 200 as discussed above. Due to the fact that the bearing assembly 200 can sustain increased loads, the width of the trolley wheel 100 can also be decreased, as discussed above.

Conventional trolley assemblies generally incorporate oil or grease lubricants which, after time, loose their effectiveness requiring that additional lubricants be added. The added lubricants are liquids which escape from the trolley wheels and accumulate on the track and the trolley brackets, where the added lubricants mix with rust and other contaminants. This mixture of added lubricants and contaminates then drops onto the articles carried by the overhead conveyor system. In the poultry industry, this phenomenon is referred to as "rail dust."

In addition to providing a lubricating function, the cured graphite 24 forms a seal, preventing dust, powders, and micro-particle contaminant from entering the bearing assembly 200 and clogging the raceway 208. In addition, the seal prevents corrosion of the balls 210 and bearing cages 212 that may be caused by cleaning solutions and contaminants.

Unlike commonly used petroleum based lubricants, the cured graphite 24 will not be washed out of the bearing assembly 200 by steam, solvents, acids or alkalis used to clean the overhead conveyor systems. In addition, the cured graphite 24 exhibits virtually no out gassing when used in vacuum applications. The cured graphite 24 functions in a wide range of operating conditions without significant changes in starting torque or lubricity (as described above). The cured graphite has an operating range of about −250 degrees Fahrenheit to about 650 degrees Fahrenheit.

The trolley assemblies 10 represent a significant advance over conventional trolley assemblies for use on overhead conveyor systems by virtue of the design of trolley wheels 100, the use of self-lubricating bearing assembly 200 and the fastening means (bolt 180 and bushing 182). First, the trolley assemblies 10 obviate the need for additional lubrication. This decreases the maintenance time and cost associated with currently available overhead conveyor systems. In addition, the trolley wheels 100 of the present disclosure reduce the coefficient of friction by approximately 50%. Existing trolley wheels using the currently available forms of lubrication have a coefficient of friction in the range of 0.049. However, the trolley wheels 100 of the present disclosure have a coefficient of friction in the range of 0.026. As a result of decreasing the coefficient of friction of the trolley wheels 100, the stress applied to the components of the overhead conveyor system is decreased, thereby increasing the life of the components of the system. For example, the life of the conveyor chain 300 is increased by decreasing the stress placed on the conveyor chain 300 as a result of the reduced coefficient of friction applied by the trolley wheel assemblies 10.

Conveyor Chain

Figure 5:
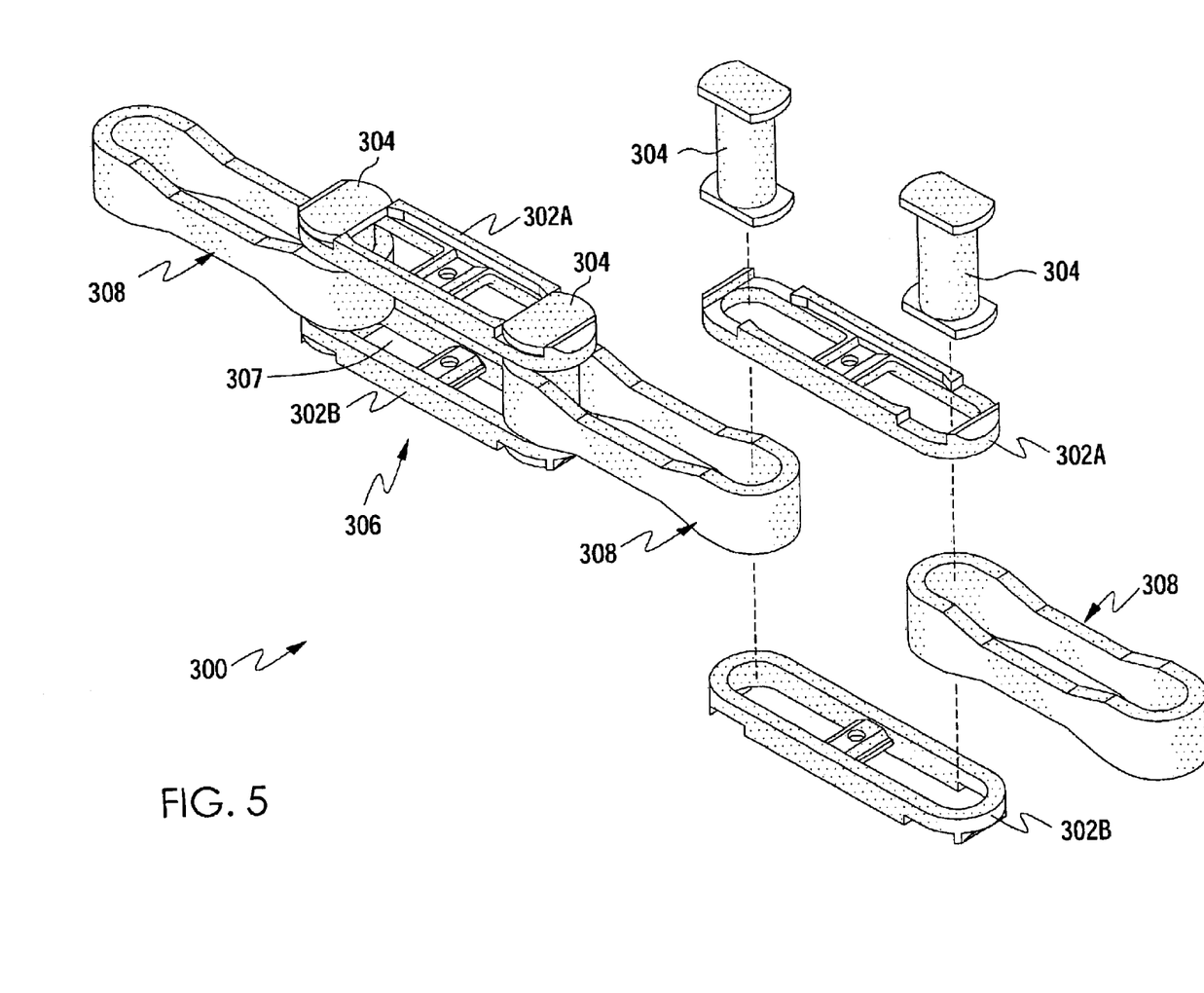
FIG. 5 shows a partially exploded side view of one embodiment of the conveyor chain.
Figure 6:
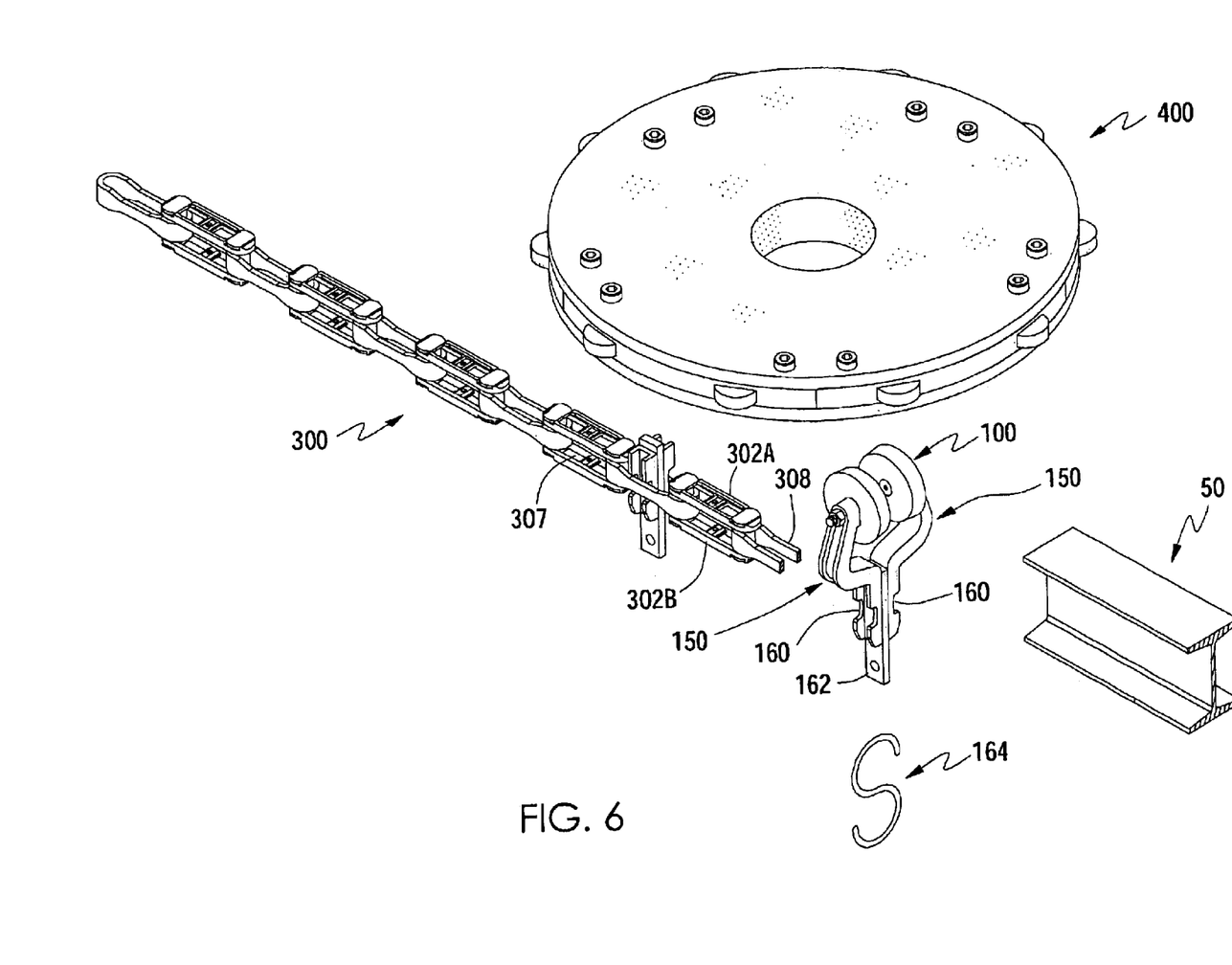
FIG. 6 shows a side view of one embodiment of the conveyor chain interacting with the trolley wheel assembly.

The conveyor chain 300 comprises a series of split halves 302A and 302B, the split halves being joined together by a fastening means, illustrated as I-pin connector 304 to form links 306 (FIG. 6). The split halves 302A and 302B and the I-pin connector 304 define at least one cavity 307 in each link 306. The links 306 of chain 300 are separated by center link 308, which is sandwiched between the split halves 302A and 302B and is also secured to the split halves 302A and 302B by I-pin connector 304 as illustrated in FIGS. 5 and 6. The distance between the centers of adjacent cavities 307 is referred to as the chain pitch. The chain pitch for most chains used in industrial processes (such as the poultry industry) is 76.5 millimetres. Central link 308 of chain 300 engages the trolley brackets 150 at notch 160 on flanges 154 (see FIG. 1 and FIG. 5). In this manner, a plurality of trolley wheel assemblies can be joined together by chain 300 to drivingly engage the trolley wheel assemblies 10 down the track 50 of the overhead conveyor system.

The chain 300 may be constructed from a variety of materials. In one embodiment, chain 300 is manufactured from cold haul quality (CHQ) steel, however other materials can be used, including, but not limited to micro-alloy steel. The I-pin connector 304 can also be made from CHQ steel. The chain 300 and I-pin connector 304 is surface hardened to about 75 Rockwell to resist stretching/changes in chain pitch, which can lead to timing errors in the conveyor system. In addition, the chain is impregnated with silicon nitride to resist corrosion and to prevent flaking that occurs in conventional chains that are simply plated with anticorrosion materials, such as zinc. The flaking off of plating materials can contaminate the environment, including the articles transported by the overhead conveyor system. In addition, areas where the plating material has been removed can provide unprotected areas that may lead to rust, corrosion and deterioration, providing a further source of contamination and decreasing chain life.

In the treatment process, the components of the chain 300 are hardened at approximately 1600 degrees F. and quenched in oil to temper. The parts of chain 300 are then placed in a furnace and covered with sand. The parts of chain 300 are heated to slightly below the tempered heat (ranging from 25–50 degrees F. below the tempered heat), which is approximately 1050–1150 degrees F. The sand bed is then injected with gasses containing silicon nitride and subject to vibration. As a result, the chain components pass through the sand bed. During this process two layers are formed, a first inner layer termed the white layer and a second outer layer which is ceramic in nature. The second layer is supported by a chemically enhanced diffusion zone and is ceramic in nature. During this process, the chain is also "lapped" which removes burrs and rough edges. This reduces the knifing effect often seen in conveyor chains as the rough edges of the chain components interact with one another. The second outer layer reaches a hardness of approximately 75 Rockwell and exhibits a microporosity that when quenched in H1 or H2 oil further protects the components of chain 300 and increases their lubricity during the chain wear in.

The strength of chain 300, in addition to resisting changes in pitch and the problems associated therewith, allows the conveyor system to operate at an increased tension. As a result, trolley wheel assemblies 10 can be placed on 12 inch centers, rather than 6 inch centers. In conventional conveyor systems, when trolley wheel assemblies were placed on 12 inch centers, the conveyor chain sagged in the middle, causing problems with chain timing and the industrial processes associated therewith. Conventional chains lacked the strength to be placed under sufficient tension to make the use of 12 inch centers feasible. By using 12 inch centers, the number of trolley wheel assemblies can be reduced by half, decreasing the cost of the system and simplifying operation.

Turn Wheel Assembly

Figure 7:
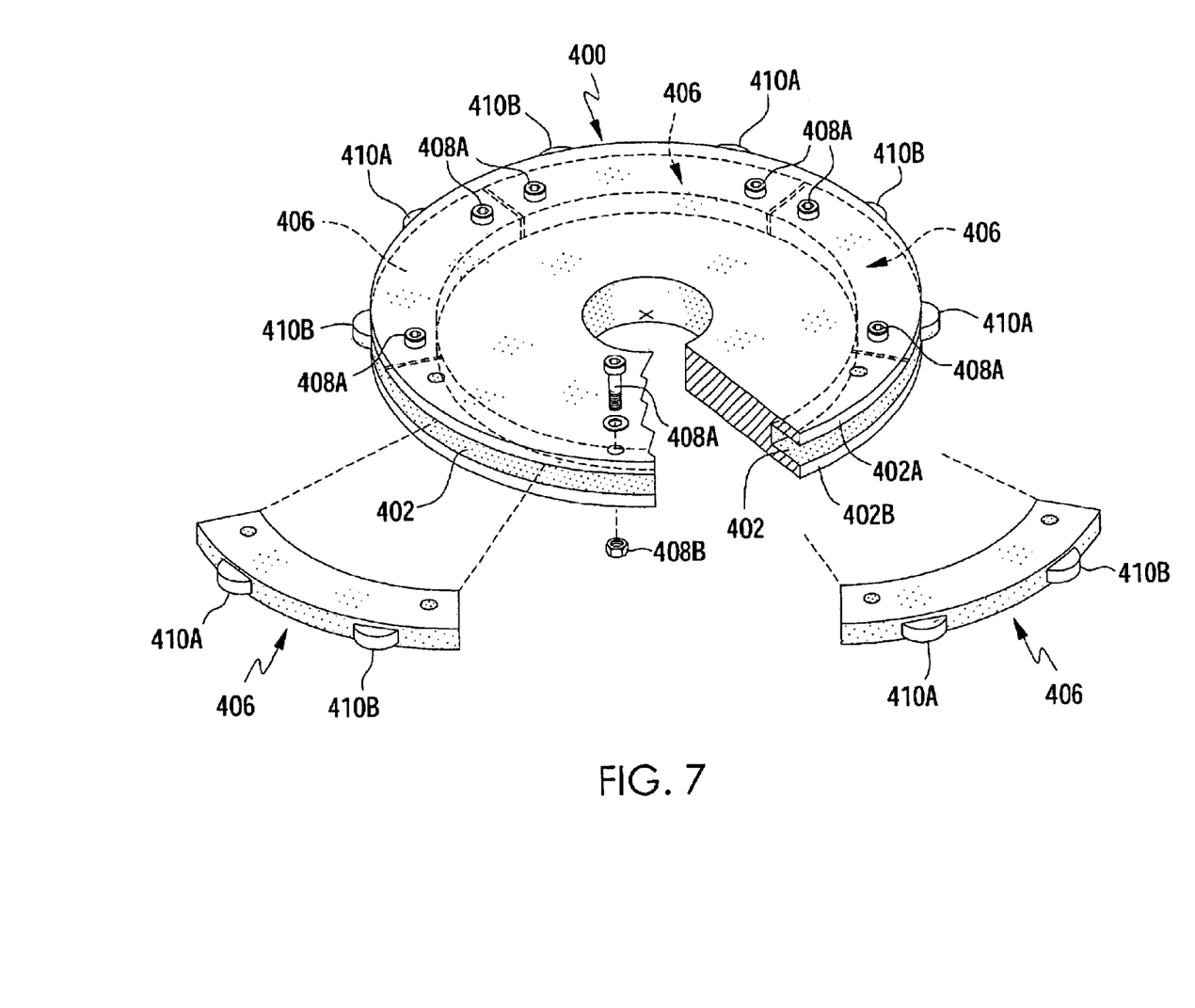
FIG. 7 shows a partially exploded side view of one embodiment of the turn wheel assembly.

The turn wheel assembly 400 functions to guide the conveyor chain 300 by maintaining the chain 300 in the vertical plane when the overhead conveyor system changes direction (FIG. 7). In one embodiment, the turn wheel assembly 400 a solid disk of material, such as UHMW. A groove 402 is machined in the disk of material, creating an upper shelf 404A above the groove 402 and a lower shelf 404B below the groove 402 (FIG. 7). The groove 402 is created such that the internal arc has an internal dimension to receive a plurality of tooth segments 406 such that the tooth segments 406 can interact with the links 306 of chain 300. The internal dimension of the arc 402 will vary depending on the diameter of the turn wheel 401. In one embodiment, the turn wheel 401 has a diameter of 19 inches and the internal arc of groove 402 has a diameter of 13.125 inches (334.4 millimetres). When the turn wheel 401 has a diameter of 24 inches, the internal arc of groove 402 has a diameter of 14.750 inches (374.7 millimetres). The exact dimensions of the groove 402 will depend on the configuration of the tooth segments 406, and such modifications are within the ordinary skill in the art. The tooth segments 406 are removably secured in place by a securing means, illustrated as bolt 408A and nut 408B. The securing means pass through the upper shelf 404A, the tooth segments 406 and the lower shelf 404B. The securing means exert a clamping effect on tooth segments 406 such that a force is applied to the tooth segments 406 that push the tooth segments outward. This force combats the force that will be applied to the tooth segments 406 as they interact with chain 300, which is typically in the range of 30 ft/lbs.

Each tooth segment 406 comprises at least one tooth. In one embodiment illustrated in FIG. 7, each tooth segment 406 comprises 2 teeth 410A and 410B. The individual teeth are spaced a distance apart so that each tooth on tooth segment 406 engages each link 306 of chain 300 so that each tooth is inserted in a cavity 307. In the embodiment illustrated in FIGS. 6–8, the individual teeth 410A and 410B are spaced approximately 76.5 millimetres apart, with the same spacing being maintained between individual teeth on adjacent tooth segments 406. This distance corresponds with the chain pitch of the conveyor chain 300 described herein. The distance between teeth can be varied to adapt to chains with different pitches, with such modification being within the ordinary skill in the art. Each tooth segment 406 may comprise a greater or lesser number of individual teeth, so long as the spacing of the individual teeth is such that each tooth on tooth segment 406 engages each link 306 of chain 300 so that each tooth is inserted in a cavity 307. The number of tooth segments 406 per turn wheel assembly 400 can also be varied, depending on the diameter of the turn wheel 400. In the embodiment illustrated in FIG. 7, the turn wheel assembly can accommodate 5 tooth segments 406. The number of individual tooth segment 406 per turn wheel 400 can be varied as long as the spacing of the individual teeth is such that each tooth on tooth segment 406 engages each link 306 of chain 300 so that each tooth is inserted in a cavity 307.

Figure 8A:
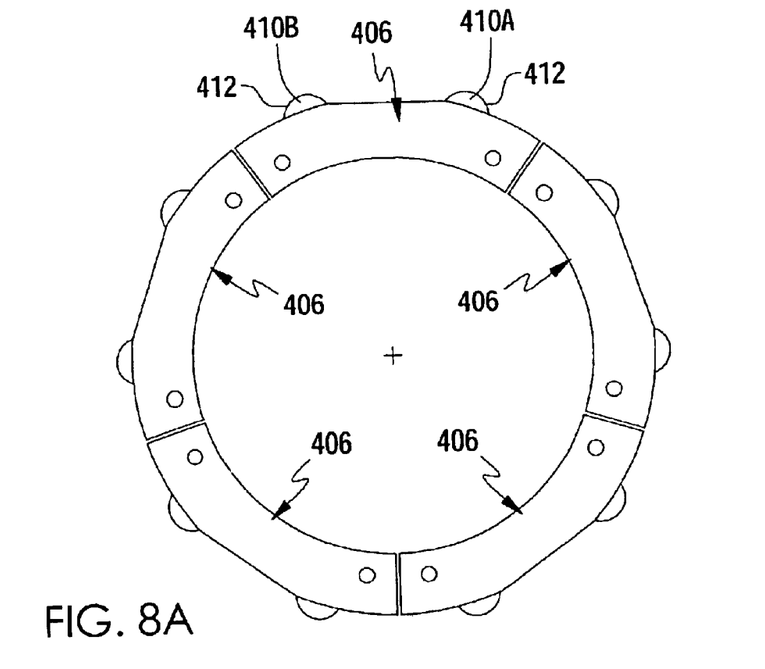
FIG. 8A shows one embodiment of the tooth profile of the individual teeth comprising the tooth segments of the turn wheel assembly.
Figure 8B:
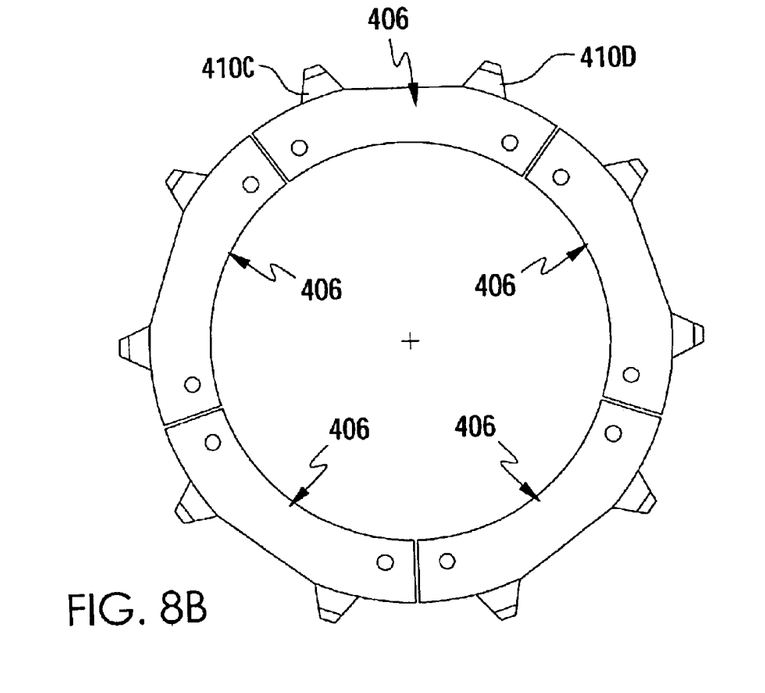
FIG. 8B shows an alternate embodiment of the tooth profile of the individual teeth comprising the tooth segments of the turn wheel assembly.

The individual teeth comprising the tooth segments 406 are designed with a profile to maximize the insertion of the individual teeth into cavity 307 of the links 306. In one embodiment, the individual teeth 410A and 410B are rounded at their periphery 412, to produce stub tooth design (FIG. 8A). The stub tooth design interacts with cavity 307 of link 306 in a fluid fashion and minimizes the contact of the outer periphery 412 of the individual teeth with the components of the chain 300, which can result in cupping of the individual teeth. The cupping effect is the result of the links 306 of the conveyor chain 300 contacting the teeth in a manner so that the individual teeth do not cleanly engage cavity 307 of link 306, but instead contact the components of the chain 300, such as the split halves 302A and 302B, as they are inserted into cavity 307. Such a situation can occur when slack is introduced in the chain 300 (effectively changing the chain pitch), or when the conveyor chain timing is not in register with the turn wheel. Although the chain 300 eliminates almost all stretching of chain 300, when turn wheel assemblies of existing overhead conveyor systems that do not use chain 300 are retrofitted with tooth segments 406 of the present disclosure (as discussed below), such stretching of the conveyor chains may, and often does, occur. The stub tooth design eliminates the cupping problems caused by chain stretching and incorrect timing, as the components of the conveyor chain slide against the rounded outer periphery 412 of the individual teeth with less contact than when the individual teeth incorporate a drive tooth design (FIG. 8B). In addition, since the outer periphery 412 of the individual teeth 410A and 410B is symmetrical, when one face of the outer periphery of the individual teeth becomes worn, the tooth segment can be removed and orientation of the tooth segments 400 in the turn wheel assembly can be reversed, extending the useful life of the tooth segments 406.

Although the stub tooth design described above offers certain advantages, other configurations of the individual teeth may be employed in the present disclosure. An alternate embodiment of the design of the individual teeth comprising the tooth segments 406 is shown in FIG. 8B. In this embodiment, the individual teeth 410C and 410D of tooth segment 406 have a roughly triangular, or drive tooth, design. The teeth 410C and 410D are spaced as described above for teeth 410A and 410B, and the same variations described above apply.

The tooth segments 406 (regardless of the design of the individual teeth) are formed from a capillary polymer material. The capillary polymer material is extruded and then molded into the desired tooth segment configuration (described above). The polymer material has an internal honeycomb structure that is impregnated with an USDA approved lubricant. In one embodiment, this lubricant is H2 oil, however other lubricants may be used, including, but not limited to H1 oil. The lubricant is introduced into the polymer mixture before it is extruded so that the lubricant is substantially uniformly incorporated into the structure of the polymer material.

In one embodiment, the method for producing the polymer material comprises hand-packing the polymer material (with added lubricant) into an appropriate mold. Once the mold is secured the polymer material is baked in an oven at approximately 350 degrees F. to cure. The polymer is removed from the mold and allowed to air cool. In one embodiment, the polymer is cast into blocks for each tooth segment. The blocks are then machined to produce the desired configuration for the individual teeth to produce the finished tooth segment 406. In another embodiment, the individual teeth can be molded in their desired configuration to produce the finished tooth segment 406.

As the individual teeth of the tooth segments 406 interact with the chain 300, heat is generated as a result of friction between the teeth and components of chain 300. As a result of the design of the individual teeth and the chain 300, the outer periphery of the individual teeth contact the interior of the cavity 307 (composed of split halves 302A and 302B) and the base of the tooth segment contacts the sides of the chain (as illustrated in FIG. 8 for teeth incorporating the stub tooth design). If desired, turn wheel assemblies 400 can be placed on opposite side of the chain 300 to ensure that the tooth segments 400 contacts the maximum area of chain 300. The change in temperature causes the lubricant trapped inside the honeycomb structure of the polymer to be released during use. As a result, the tooth segments 406 of turn wheel assembly 400 apply a constant light film of lubricant to the chain 300, especially the components of the links 306. This makes the turn wheel assembly 400 an automatic lubricating device in addition to its other functions. The stub tooth design of the individual teeth assures that the lubricant is applied to a substantial portion of the chain 300. This coating of lubricant deters rusting or corrosion and provides a protective barrier to chain 300. In addition, the insertion of the individual teeth of the tooth segments 406 into cavity 307 removes any existing rust and corrosion that may be present on the chain 300. As a result, the useful life of the chain 300 is increased and the maintenance required is reduced. Since the chain 300 is constantly lubricated, the need for additional chain lubrication is obviated, reducing the possibility that lubricant will come into contact with the items carried by the conveyor system and reducing the occurrence of "rail dust" and similar phenomenon.

When the lubricant is released from one or more honeycomb structures, the honeycomb structure collapses, and the residual polymer is removed by the friction between the chain 300 and the individual teeth on the tooth segments 406. Since the polymer material is comprised of an essentially homogenous honeycomb structure, lubricant continues to be release from successive honeycomb structures. As a result of continuous lubrication, the tooth segments 406 have a finite service life. In prototypes used by Applicant, the tooth segments 406 have a life of approximately 7 months. The life to the tooth segments 400 is dependent on line tension and line speed, with the 7 month life based on an average chain speed of 78 RPM. The turn wheel assembly 400 is designed so that individual tooth segments 406 may be easily replaced as desired without removing the entire turn wheel assembly 400, and without replacing the entire turn wheel assembly 400. For replacement, the securing means, in this embodiment bolt 408A and nut 408B, a removed, a new tooth segment 406 inserted and the securing means reinserted.

Conventional turn wheel assemblies generally do not employ tooth segments as does the turn wheel 400 of the present disclosure. Instead, conventional turn wheel assemblies employ a smooth material on the surface of the turn wheel assembly that contacts the chain. In other words, conventional turn wheel assemblies function only to keep the chain in the correct plane. Tooth segments 406 are designed so that conventional turn wheel assemblies may be retrofitted with the tooth segments 406 of the present disclosure. Through such retrofitting, the conventional turn wheel assemblies are converted into automatic lubricator, with the advantages discussed above.

Advantages

The components of the overhead conveyor system of the present disclosure offer maximal benefit when all the components described, the trolley assembly 10, the conveyor chain 300 and turn wheel assembly 400, are incorporated. However, it is within the scope of this disclosure that the individual components may be incorporated (either alone or in various combinations) into existing overhead conveyor systems, thereby improving the performance and extending the life of the existing overhead conveyor systems. As one example, and not meaning to exclude additional examples, the tooth segments 406 may be solely incorporated into existing turn wheel assemblies as discussed above.

As discussed in this specification the use of the conveyor system of the present disclosure significantly extends the overall life of the conveyor system and decreases the maintenance costs associated with the system. These factors result in significant costs savings to the operator of the overhead conveyor system. An example of the cost savings using the overhead conveyor system of the present disclosure makes this point. The following example uses USDA average numbers for existing overhead conveyor systems.

A typical conveyor system has a chain length of 600 feet. The average life of a chain is approximately 14 months, with the cost of the chain being $20 per foot, plus $2,400 for installation of the track (based on 30 man hours/installation at $80/man hour). Under normal operating conditions, an average overhead conveyor system processes 91 birds per minute.

The cost/foot of conveyor chain 300 is $59.95. In order to compare the cost of the conveyor chain 300 to the average cost of conventional conveyor chains, the increased life and decreased maintenance cost of the conveyor chain of the present disclosure must be taken into account. The conveyor chain 300 has an estimated life of approximately 42 months, or 3 times the average life of conventional conveyor chains. Taking into account the fact that three conventional chains (at $20/foot) must be used to equal the expected life of chain 300, the base cost of conventional conveyor chains is $60/foot. Adding the manpower cost to replace the conveyora chain 2 times ($4,800, at a cost of $2,400/installation) the cost of the average 600 foot conveyor chain increases another $8/foot.

The increased maintenance costs of conventional conveyor chains must also be taken into account. As discussed above, on average 15 minutes/day is spent lubricating and cleaning conventional conveyor chains. Based on a 5 day work week, 52 weeks/year, an average of 65 hours per year is spent on this type of maintenance. At $30/man hour, this is $1,950/year. Since the conveyor chain 300 does not require lubrication or cleaning when used in conjunction with turn wheel assembly 400, this maintenance cost is not incurred. Over the 42 month life of the conveyor chain 300, this amounts to a total savings of $6,825. For a typical 600 foot chain, this adds an additional $11.38/foot costs to the use of conventional conveyor chains.

Finally, the conveyor chain 300, because of its superior properties, allows overhead conveyor systems to operate more efficiently, resulting in savings in energy cost of the life of conveyor chain 300. An average conveyor line utilizing convention conveyor chains draws an average of 12.7 Amps 460 volts, which is equal to 5.8 Kilowatts (kw)/hr. At an average cost of $0.04 per kw/hr and assuming 16 hours of operation/day, the total energy cost is $3.68/day for a conveyor system utilizing conventional conveyor chains. Operating 5 days/week, 52 weeks/year, this amounts to a total energy cost of $956.80/year. The use of the conveyor chain 300 reduces the energy consumption of an overhead conveyor system by 30%, a savings of $287.04/year. Over the 3.5 year (42 month) life of conveyor chain 300, this amounts to a total savings of $1007.80. For a typical 600 foot chain, the additional energy cost in using conventional conveyor chains adds an addition cost of $1.68/foot.

Adding these costs together, the total cost for the use of conventional conveyor chains is $81.06/foot. The cost of using conveyor chain 300 is $59.95/foot. Therefore, the use of conveyor chain 300 results is a savings of $21.11/foot, a 26% cost savings over the life of the conveyor chain 300.

In addition to the cost savings associated with the procurement and maintenance of the conveyor chain 300, cost savings are also realized when lost production issues are considered. On average, 7 minutes/day production time is lost due to problems with conventional conveyor chains. These problems require the entire conveyor system be shut down, and are generally caused by removing chain slack from the conveyor chain (caused by increases in chain length/pitch), or dealing with problems associated with chain slack. Assuming a 5 day work week, 52 weeks/year, this amounts to 1,820 minutes/year. As a cost of $660 per lost minute of production, this amounts to a cost of $1,202,200/year. As discussed in detail above, the conveyor chain 300 is specially designed to virtually eliminate chain slack when used in the overhead conveyor system of the present disclosure. Therefore, the lost production costs are avoided when conveyor chain 300 is used. Over the 3.5 year life of the conveyor chain 300, the total savings realized is $4,202,200.

Production loss must also be considered when calculating total cost savings. One of the most common causes of lost production is chain stretch. The more a chain stretches, the more links of chain must be removed in order to ensure the overall chain length remains constant. If chain length does not remain constant, then the timing of the conveyor system may be adversely impacted, with adverse impact on the associated industrial process. An average conveyor chain will stretch 2 inches per 10 feet of chain, with 70% of this stretch occurring in the first 5 weeks of use. This chain stretch of 2 inches per 10 feet will result in a loss of capacity equal to one bird for every 30 feet of chain (based on 6 inch centers). For a 600 foot chain, this is a loss of capacity equal to 20 birds per conveyor system complete revolution. A conveyor system with a 600 foot chain processing 91 birds/minute will make a complete revolution every 13.18 minutes. In a 16 hour operating day, a conveyor system makes 72 complete revolutions. At a loss of 20 birds per revolution, a total capacity of 1,440 birds is lost per day. Assuming a 5 day work week, 52 weeks per year, a capacity of 374,400 birds is lost per year. Over the 3.5 year (42 month) life of conveyor chain 300, a total capacity of 1,310,400 birds is lost. Assuming an average 5 pound bird at $0.50 per pound, each bird lost represents a loss of $2.50. Multiplied by the total number of birds lost, the total cost for the lost capacity over the life of conveyor chain 300 is $3,276,000.

The total cost due to production lost due to downtime and production lost due to lost capacity (chain stretch) is $7,478,200 when using conventional overhead conveyor systems. As discussed in detail above, the conveyor chain 300 is specially designed to virtually eliminate chain slack when used in the overhead conveyor system of the present disclosure, thereby eliminating the costs attributable to lost production.

What is claimed is:

1. A self lubricating, overhead conveyor system comprising:
   a. an overhead track comprising a central support and a plurality of flanges extending from the support;
   b. a plurality of trolley assemblies, each trolley assembly comprising a trolley bracket and a pair of trolley wheel assemblies removably secured to the bracket by a fastening means comprising a bolt and a bushing, with each trolley wheel assembly comprising a trolley wheel having a self-contained unitary ball bearing assembly comprising an inner race, an outer race, and a floor joining the inner race and the outer race to create a raceway, said inner race supported by said bushing, a plurality of balls situated in the raceway and a solid lubricating means encapsulating the balls and substantially filling the raceway, the fastening means coupling the trolley wheel assemblies to the bracket by contacting only the inner race of the ball bearing element such that the inner race is not subject to a pre-loading condition;
   c. a conveyor chain comprising a plurality of links, with each link having a central cavity, the links joined together by a central member, the central member configured to engage the trolley bracket;
   d. a lubricating turn wheel assembly comprising a plurality of tooth segments engaging the conveyor chain, said tooth segments being impregnated with a lubricant and providing constant lubrication to the conveyor chain; and
   e. a drive means to drive the conveyor system along the track.

2. The system of claim 1 where the trolley wheel further comprises a front side, a back side and a peripheral outer surface joining the front side and the back side, the front side having a chamber defined by a partial floor and a circular side wall, the chamber receiving the ball bearing assembly, the back side containing an aperture to receive the fastening means, and the outer peripheral surface having an angle of 5–15 degrees as measured from the back side of the trolley wheel to the front side of the trolley wheel.

3. The system of claim 2 where the chamber is sealed by a cover, the cover having an aperture to receive the fastening means.

4. The system of claim 3 where the cover is sonically welded to the uppermost portion of the circular side wall of the chamber.

5. The system of claim 2 where the angle is 7 degrees.

6. The system of claim 1 where the trolley wheel is manufactured from a material selected from the group consisting of ultra-high molecular weight, polypropylene, polyethylene, polytetrafluoroethylene, and acetyl.

7. The system of claim 6 where the trolley wheel is manufactured from an acetyl homo-polymer.

8. The system of claim 1 where the trolley wheel has a width of about 19 millimeters.

9. The system of claim 1 where the ball bearing assembly further comprises a groove in the raceway to guide the plurality of ball through the raceway.

10. The system of claim 1 where the ball bearing assembly further comprises at least one bearing cage, so that the balls do not contact one another.

11. The system of claim 1 where the balls are precision ground.

12. The system of claim 11 where the balls are manufactured from stainless steel.

13. The system of claim 1 where the lubricating means is selected from the group consisting of graphite and a graphite phenolic resin.

14. The system of claim 13 where the lubricating means is a graphite phenolic resin, and the graphite phenolic resin is added to the ball bearing assembly in liquid form and heat cured to a solid form.

15. The system of claim 14 where the graphite material is heat cured at a temperature of from about 250 degrees Fahrenheit to about 650 degrees Fahrenheit for about two hours.

16. The system of claim 13 where the lubricating means provides a barrier against entry of contaminants into the ball bearing assembly.

17. The system of claim 13 where the rotation of the balls against the lubricating means constantly provides lubrication to the balls in the ball bearing assembly.

18. The system of claim 13 where the lubricating means virtually eliminates in inertia drag and reduces a coefficient of friction associated with the rotation of the balls in the raceway.

19. The system of claim 18 where the measured inertia drag of the trolley wheel assembly is about 0.001 Vs and the measured coefficient of friction is 0.26.

20. The system of claim 1 where the fastening means comprises a bolt, a securing means adapted to engage the bolt and a bushing, the bolt further comprising a head configured to remain entirely within plane formed by the back side of the trolley wheel and the bushing further comprising a crown and a spacer portion.

21. The system of claim 20 where the securing means is a self securing nut.

22. The system of claim 20 where the bolt head is less than 1/8 of an inch thick.

23. The system of claim 20 where the bolt and the securing means are manufactured from stainless steel or carbon steel and the bushing is manufactured from ultra-high molecular weight, polypropylene, polyethylene, polytetrafluoroethylene, or acetyl.

24. The system of claim 20 where the bolt and securing means are manufactured from carbon steel impregnated with silicon nitride and surface hardened to about 75 Rockwell and the bushing is manufactured from an acetyl homopolymer.

25. The system of claim 20 where the crown is configured to engage the bearing assembly to allow self-adjustment of the trolley wheel and the spacer portion is configured to prevent the trolley bracket from impacting the trolley wheel.

26. The system of claim 25 where the length of the spacer portion is from about 8 millimeters to about 12 millimeters.

27. The system of claim 20 where the bushing is filled with a glass fiber to resist compression.

28. The system of claim 20 where the head of the bolt is secured against the inner race of the ball bearing assembly such that the inner race does not rotate about a perpendicular axis of the bolt and the bushing is secured against the inner race of the ball bearing assembly opposite the head.

29. The system of claim 1 where each link comprises a pair of split halves, the split halves secured together and to the central member by a fastening means.

30. The system of claim 29 where the links, the central member and the fastening means are surface hardened to about 75 Rockwell.

31. The system of claim 29 where the links, the central member and the fastening means are impregnated with silicon nitride.

32. The system of claim 29 where the links, the central member and the fastening means are surface hardened to about 75 Rockwell and impregnated with silicon nitride.

33. The system of claim 1 where the conveyor chain is lapped to remove rough edges.

34. The system of claim 1 where the conveyor chain is manufactured from material selected from the group consisting of cold haul quality steel and microalloy steel.

35. The system of claim 1 where the conveyor chain has a chain pitch of about 76.5 millimeters.

36. The system of claim 32 where the conveyor chain is resistant to changes in chain pitch.

37. The system of claim 1 where the tooth segments are manufactured from a capillary polymer material.

38. The system of claim 37 where the lubricant is selected from the group consisting of H1 oil and H2 oil.

39. The system of claim 37 where the tooth segments engage the cavity of the links and provide constant lubrication to the conveyor chain.

40. The system of claim 39 where the plurality of tooth segments further comprises at least one tooth.

41. The system of claim 39 where the plurality of tooth segments further comprises two individual teeth.

42. The system of claim 41 where the individual teeth have a rounded periphery.

43. The system of claim 41 where the individual teeth have an angular periphery.

44. The system of claim 37 where the turn wheel assembly further comprises a groove to receive the plurality of tooth segments, the groove comprising an internal arc and the plurality of tooth segments is secured in the turn wheel assembly by a securing means.

45. The system of claim 44 where the securing means exerts an outward clamping pressure on the plurality of tooth segments.

46. The system of claim 36 where the trolley wheel assemblies are placed on 12 inch centers.

47. The system of claim 36 where the trolley wheel assemblies are placed on 6 inch centers.

* * * * *